United States Patent
Schrodinger et al.

(10) Patent No.: US 7,460,788 B2
(45) Date of Patent: Dec. 2, 2008

(54) TRANSMITTING AND RECEIVING DEVICE

(75) Inventors: Karl Schrodinger, Berlin (DE); Kirk Cook, Lyons, CO (US); Yung-Shun Wu, Longmont, CO (US)

(73) Assignee: Ezconn Corporation, Taipei (TW)

( * ) Notice: Subject to any disclaimer, the term of this patent is extended or adjusted under 35 U.S.C. 154(b) by 601 days.

(21) Appl. No.: 10/796,802

(22) Filed: Mar. 8, 2004

(65) Prior Publication Data

US 2005/0095994 A1 May 5, 2005

Related U.S. Application Data (60) Provisional application No. 60/515,617, filed on Oct. 29, 2003.

(51) Int. Cl.
*H04B 10/00* (2006.01)

(52) U.S. Cl. .................. 398/135; 398/136; 398/137; 398/138; 398/139; 398/128; 398/130; 398/158; 398/159; 398/161; 398/192; 398/194; 398/195; 398/202; 398/208; 398/209; 398/182; 398/41; 398/42; 398/214; 385/88; 385/89; 385/92; 385/93; 455/78; 455/73; 372/29.01; 372/38.01; 372/38.02; 250/214 A; 250/214 LA; 250/214 AG; 250/214 R; 250/214 C (58) Field of Classification Search ............. 398/41, 398/42, 135, 139, 140, 137, 102, 182, 202, 398/192, 194, 195, 208, 209, 213, 136, 138, 398/128, 130, 158, 159, 214, 161, 183; 385/88, 385/89, 92, 93; 455/78, 73; 372/29.01, 38.01; 250/214 A, 214 LA, 214 AG, 214 R, 214 C
See application file for complete search history.

(56) References Cited

U.S. PATENT DOCUMENTS

| 5,317,441 | A | * | 5/1994 | Sidman | 398/41 |
| 5,594,577 | A | * | 1/1997 | Majima et al. | 398/79 |
| 6,731,881 | B2 | * | 5/2004 | Nomura | 398/135 |

* cited by examiner

*Primary Examiner*—Hanh Phan
(74) *Attorney, Agent, or Firm*—GSS Law Group

(57) ABSTRACT

A transmitting and receiving device, in which the received signal which is produced by the receiving device has only a small amount of crosstalk. This object is achieved by providing a transmitting and receiving device having a transmitting device for producing a transmission signal, a receiving device for producing a received signal, and a compensation device which is connected to the transmitting device and to the receiving device and which at least reduces any crosstalk which is produced by the transmitting device in the receiving device.

17 Claims, 5 Drawing Sheets

TRANSMITTING AND RECEIVING DEVICE

RELATED APPLICATION

The present application claims priority of U.S. Patent Application Ser. No. 60/515,617 filed by Karl Schrodinger, Kirk Cook and Yung-Shun Wu on Oct. 29, 2003.

FIELD OF THE INVENTION

The present invention is generally directed to opto-electronic communication systems, and in particular to bidirectional optical transmitting and receiving devices.

BACKGROUND OF THE INVENTION

In some circumstances, crosstalk which is caused by the transmitting device occurs in the receiving device in transmitting and receiving devices having a transmitting device and a receiving device, as a result of which the reception quality of the signals received by the receiving device becomes worse. The crosstalk may occur electrically or—particularly in the case of optical transmitting and receiving devices—else optically, and occurs in particular when the optical or electrical inputs and outputs of the transmitting device and of the receiving device are close to one another.

In the case of bidirectional optical transmitting and receiving devices, by way of example, in which both the transmitting device and the receiving device are connected to one and the same glass fiber, the problem of crosstalk occurs to an increased extent.

Furthermore, monolithically integrated transmitting and receiving devices are also affected by the problem of crosstalk, with electrical crosstalk being the primary problem in the case of monolithically integrated transmitting and receiving devices.

Previous solution approaches in order to reduce the electrical or optical crosstalk have gone down the route of shielding the transmitting device and the receiving device from one another as well as possible in order to completely prevent crosstalk from occurring. However, these solution approaches have the problem that, as the transmitting and receiving devices are increasingly miniaturized, good or adequate shielding can be achieved only to a limited extent.

What is needed is a transmitting and receiving device in which the received signal which is produced by the receiving device has only a small amount of crosstalk.

In this case, the aim is to make it possible to achieve a particularly low level of crosstalk, particularly in the case of optical transmitting and receiving devices, as well.

By way of example, in the case of bidirectional optical systems in which the transmission signal and the received signal are transmitted on one and the same glass fiber, the aim is to largely solve the problem of crosstalk.

SUMMARY OF THE INVENTION

In order to solve the problem of crosstalk, the invention provides a transmitting and receiving device in which there is a compensation device which is connected to a transmitting device of the transmitting and receiving device and to a receiving device of the transmitting and receiving device and which at least partially reduces any crosstalk which is produced by the transmitting device in the receiving device.

One major advantage of the invention is that it is possible to largely dispense with these shielding measures, which result in high costs, specifically because crosstalk can be accepted; this is because any crosstalk which occurs can be reduced "retrospectively" in the transmitting and receiving device according to the invention. In contrast to the previous methods for reduction of crosstalk, in which the crosstalk is prevented in advance by means of shielding measures, the transmitting and receiving device according to the invention adopts a completely different solution approach in that, specifically, crosstalk which has already occurred is reduced or "counteracted" "retrospectively".

In order to reduce the crosstalk, the compensation device preferably has a signal conditioning unit for forming a compensation signal which maps the crosstalk which is produced by the transmitting device in the receiving device.

The compensation device furthermore preferably comprises a subtraction device which is connected to the receiving device and to the signal conditioning unit and which subtracts the compensation signal from the received signal from the receiving device, forming a received signal with reduced crosstalk. Thus, in this refinement of the invention, a type of "phantom" signal is produced in the compensation device, which reflects the crosstalk which is produced by the transmitting device in the receiving device. The "phantom" signal is then subtracted from the output signal from the receiving device, which thus initially has the undesirable crosstalk, such that the crosstalk signal component which is caused by the crosstalk is filtered out of the signal received by the receiving device.

In order to make it possible to externally influence or control the formation of the compensation signal by the signal conditioning unit, the signal conditioning unit advantageously has at least one control connection via which the formation of the compensation signal can be influenced or controlled.

A monitoring unit is preferably connected to the at least one control connection of the signal conditioning unit, to whose input side the received signal with reduced crosstalk from the subtraction device or a signal which is proportional to it is applied, and whose output side drives the signal conditioning unit so as to achieve maximum compensation for the crosstalk. The object of the monitoring unit is thus to monitor the effect and the operation of the signal conditioning unit and of the subtraction device, and always to drive the signal conditioning unit so as to achieve optimum compensation for the crosstalk, and so as to ensure that the crosstalk is optimally filtered out.

In order to allow the signal conditioning unit to be driven in a particularly simple and thus advantageous manner, the signal conditioning unit has at least one controllable signal propagation time matching device, one controllable signal attenuation device and/or a high-pass filter with a controllable cut-off frequency.

The signal conditioning unit may, for example, have a single channel if, for example, only one type of crosstalk is present, for example electrical crosstalk. If, on the other hand, two or more types or two or more mechanisms of crosstalk exist—for example electrical and optical crosstalk—two or more channels are required in the signal conditioning unit if the aim is to compensate as completely as possible for the crosstalk. It is thus regarded as advantageous for the signal conditioning unit to have at least two controllable subunits, whose output sides are connected to a signal adder which uses the output signals from the subunits to form the compensation signal. The subunits are then preferably each equipped with a controllable signal propagation time matching device, with a controllable signal attenuation device, and/or with a high-pass filter with a controllable cut-off frequency.

Since the problem of crosstalk occurs to an increased extent particularly in the case of bidirectional optical systems, it is regarded as advantageous according to one development of the transmitting and receiving device according to the invention for the invention to be used for optical transmitting and receiving devices which convert an input signal that is applied to an electrical input to an optical output signal, and emit this optical output signal at an optical output.

The signal conditioning unit and the subunits of the signal conditioning unit may then be connected on the input side, for example, to the electrical input of the optical transmitting device or to the optical output of the optical transmitting device.

If the optical transmitting device has an optical transmitting element and a monitor diode which is associated with the optical transmitting element, then at least one of the subunits or the signal conditioning unit may be connected as such to a monitor connection of the monitor diode. For example, the optical signal power of the optical transmitting element can be measured using the monitor diode, and the signal conditioning unit can be driven as a function of the measured optical signal power of the optical transmitting element.

Another development of the transmitting and receiving device according to the invention provides for the monitoring unit to be connected to a control connection of the transmitting device, via which the transmitting device can be driven by the monitoring unit, with the monitoring unit being designed such that it modifies or switches off the transmission signal from the transmitting device in order to optimize the drive for the signal conditioning unit. The transmission signal from the transmitting device is preferably modified or switched off only during short time intervals in which the drive for the signal conditioning unit is being monitored or readjusted; as soon as an optimum drive for the signal conditioning unit is achieved, the monitoring unit ends its influence on the transmission signal, so that the transmitting device can continue to process the "original transmission signal", and can thus transmit it.

The monitoring unit preferably has a measurement unit, a register and a control unit. The monitoring unit uses the measurement unit to measure the received signal with reduced crosstalk. Control signals by means of which the controllable signal conditioning unit can be driven are stored in the register. The control unit, which interacts with the measurement unit and the register, chooses the respectively suitable control signals for driving the signal conditioning unit as a function of the values measured by the measurement unit.

The output side of the register is preferably connected to at least one digital/analog converter unit, which converts the control signals from the register from analog to digital form, and supplies them to the signal conditioning unit.

DESCRIPTION OF A PREFERRED EXEMPLARY EMBODIMENT

Figure 1:
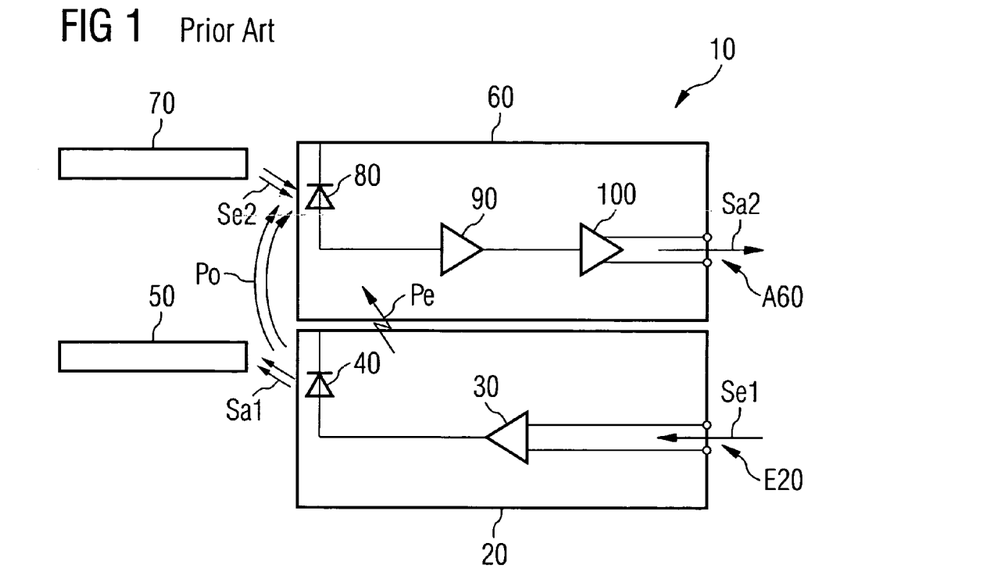
FIG. 1 shows a transmitting and receiving device according to the prior art.

FIG. 1 shows a transmitting and receiving device 10 according to the prior art. The transmitting and receiving device 10 has a transmitting device 20, to whose electrical input E20 an amplifier 30 is connected. The amplifier 30 is followed by a laser diode 40, which emits an optical output signal Sa1. The optical output signal Sa1 is injected into an optical waveguide 50, which is coupled to the laser diode 40.

The transmitting and receiving device 10 furthermore has a receiving device 60 to which a second optical waveguide 70 is connected. The optical waveguide 70 is connected to a photodiode 80 for the receiving device 60 such that the light Se2 which is emitted from the optical waveguide 70 can be injected into the photodiode 80. The photodiode 80 is connected to a preamplifier 90, which is followed by a main amplifier 100. The output of the main amplifier 100 forms an electrical output A60 of the receiving device 60.

As is indicated by arrows with the reference symbols Po and Pe in FIG. 1, the transmitting device 20 can cause crosstalk in the receiving device 60 both electrically and optically. The electrical crosstalk is in this case symbolized by an arrow Pe, and the optical crosstalk is symbolized by an arrow Po. The electrical output signal Sa2 at the electrical output A60 of the receiving device 60 is thus a superimposition of the signal Se2, which is injected into the photodiode 80 through the optical waveguide 70, and a crosstalk signal Pe+Po, which is caused by the optical and electrical crosstalk.

Figure 2:
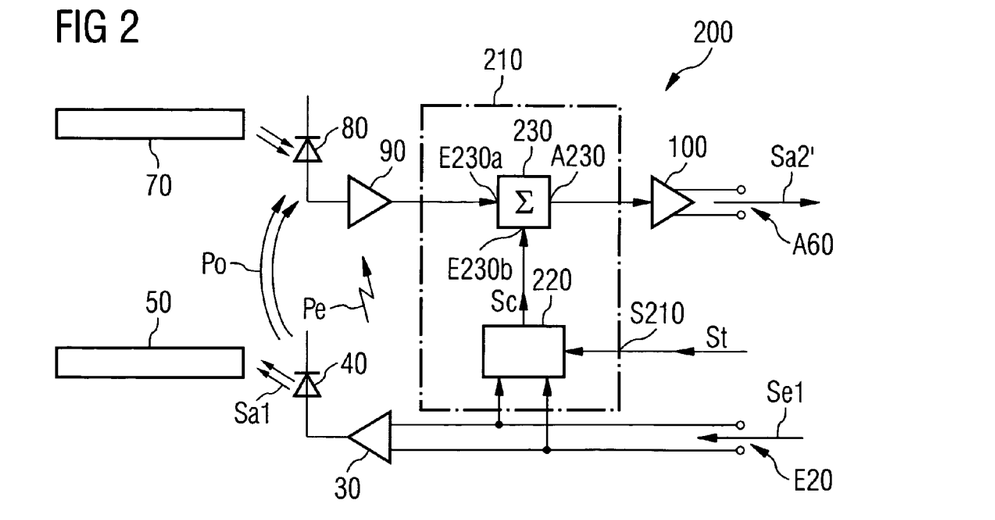
FIG. 2 shows a first exemplary embodiment of a transmitting and receiving device according to the invention having a compensation device.

FIG. 2 shows a first exemplary embodiment of a transmitting and receiving device 200 according to the invention. Where the transmitting and receiving device 200 has the same components as those which have already been explained in conjunction with FIG. 1, the same reference symbols are used in the following text.

FIG. 2 shows a compensation device 210 which is connected to the electrical input E20 of the transmitting device 20, and between the preamplifier 90 and the main amplifier 100 of the receiving device 60. The compensation device 210 also has one or more control connections S210, via which one or more control signals or else an "overall" control signal St which is formed by a number of "individual" control signals can be fed into a signal conditioning unit 220 of the compensation device 210. The input side of the signal conditioning unit 220 is also connected to the electrical input E20 of the transmitting device 20.

Furthermore, the compensation device 210 has a subtraction device 230, one input E230a of which is connected to the output of the preamplifier 90, while a further input E230b is connected to the output of the signal conditioning unit 220. One output A230 of the subtraction device 230 is connected to one input of the main amplifier 100.

The compensation device 210 as shown in FIG. 2 has the object of simulating the optical and electrical crosstalk which is caused by the transmitting device 20 in the direction of the receiving device 60. This is based on the assumption that the optical and electrical crosstalk is directly related to the electrical input signal Se1 at the electrical input E20 of the transmitting device 20, so that, by evaluation and further processing of the electrical input signal Se1, it is possible to form a compensation signal Sc which maps the crosstalk which is produced by the transmitting device 20 in the receiving device 60. If the compensation signal Sc is now subtracted from the output signal from the preamplifier 90 in the subtraction device 230, then an output signal which is free of crosstalk, or whose crosstalk has been reduced, is produced at the output A230 of the subtraction device 230 and is amplified by the main amplifier 100 in order to form an output signal Sa2' whose crosstalk has been reduced. The signal Sa2' whose crosstalk has been reduced thus corresponds to the signal received by the receiving device 60 after the crosstalk has been "filtered out" in the subtraction device 230.

Figure 3:
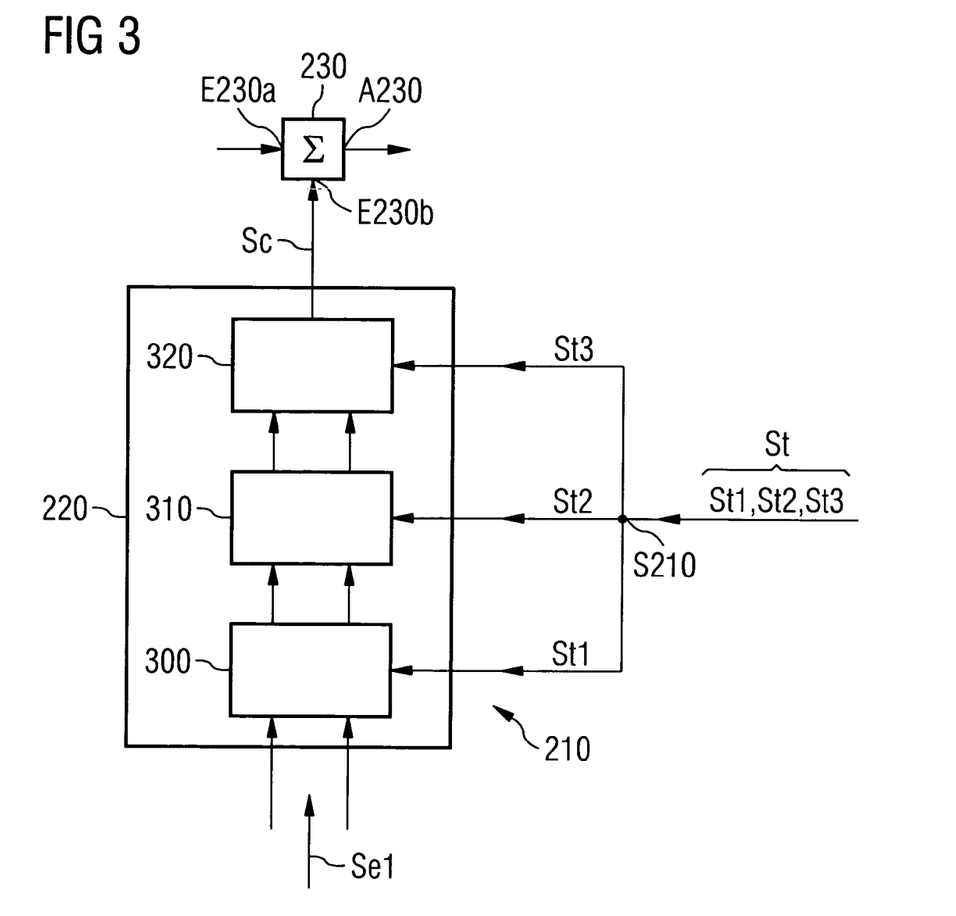
FIG. 3 shows a first exemplary embodiment of a compensation device for the transmitting and receiving device shown in FIG. 2.

FIG. 3 shows a first exemplary embodiment of a compensation device 210 as shown in FIG. 2. In this first exemplary embodiment, the signal conditioning unit 220 carries out only single-channel "signal processing". If, for example, the aim is to correct only one type of crosstalk—by way of example the electrical or the optical crosstalk—then single-channel processing and formation of the compensation signal Sc is sufficient.

The signal conditioning unit 220 has a controllable high-pass filter 300 with a cut-off frequency which can be predetermined, on the input side. The cut-off frequency of the controllable high-pass filter 300 is predetermined by a control signal St1 which is fed into the signal conditioning unit 220 via the control connection S210.

The controllable high-pass filter 300 is followed by a signal propagation time matching device 310, which carries out signal propagation time modification or "phase shifting". The extent of the signal propagation time shift or the extent of the phase shift is governed by a second control signal St2, which is likewise passed via the control connection S210 to the signal conditioning unit 220.

The signal propagation time matching device 310 is followed by a controllable signal attenuation device 320, which attenuates the amplitude or the power of the signal which is transmitted from the signal propagation time matching device 310. The controllable signal attenuation device 320 is driven by a third control signal St3, which is likewise transmitted via the control connection S210 and predetermines the extent of the attenuation.

The three control signals St1, St2, St3 can be transmitted via a single control line and thus via a single control connection S210, as is indicated in FIG. 2. Alternatively, the three control signals St1 to St3 can also be transmitted via separate control signal lines; this is then dependent on further control connections S210, although these are not shown in FIG. 2, for the sake of clarity. The control connection S210 and the control signal St in FIGS. 2 and 3 thus represent a large number of separate control connections and separate control signals. The control signals may be transmitted in analog or digital form.

FIG. 3 furthermore shows the subtraction device 230 which, for example, may be in the form of an analog adder. In order to use the analog adder to achieve a subtraction effect, the compensation signal Sc which is formed by the signal conditioning unit 220 must be added in inverted form to the output signal from the preamplifier 90.

Figure 4:
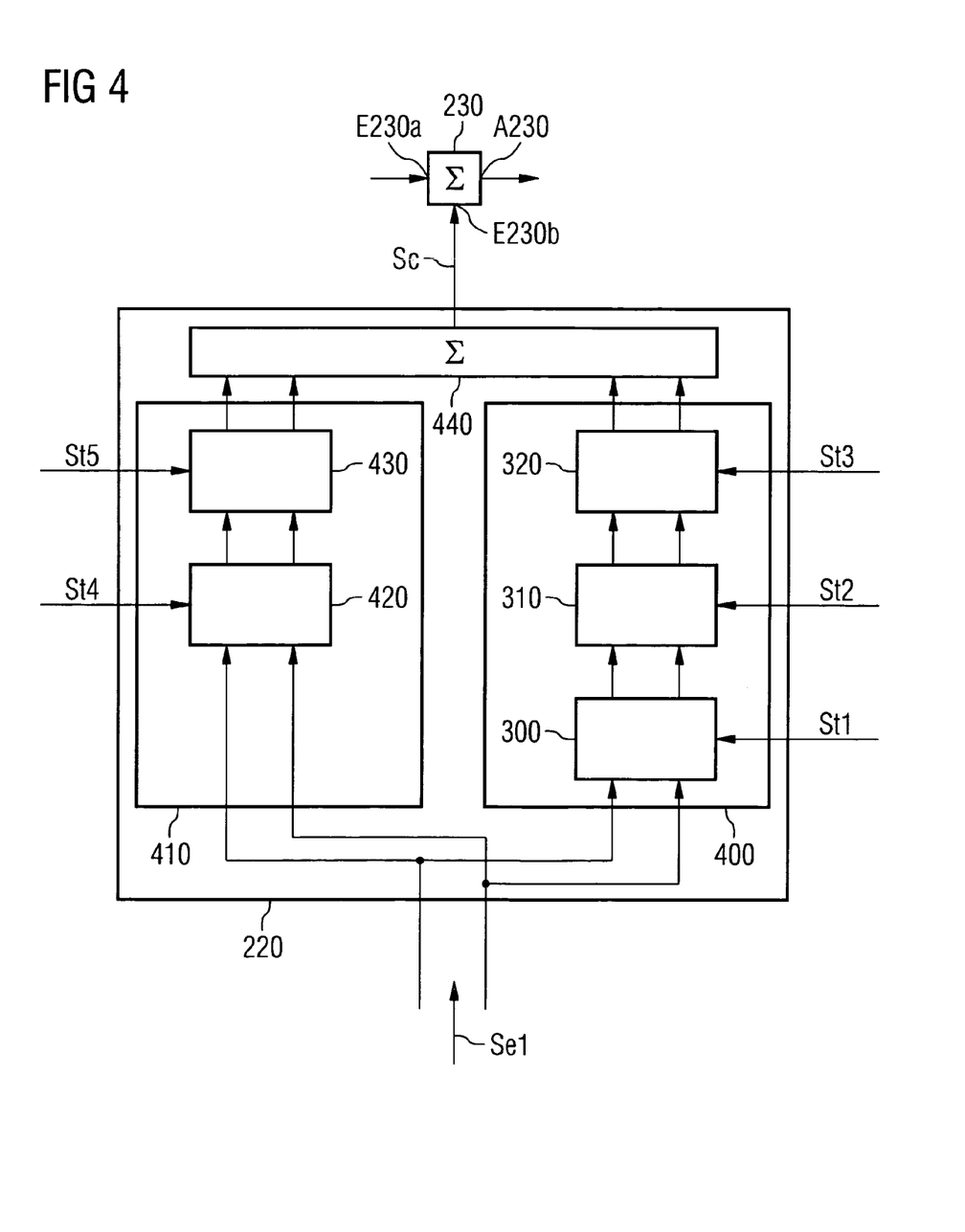
FIG. 4 shows a further exemplary embodiment of a compensation device for the transmitting and receiving device shown in FIG. 2.

FIG. 4 shows a second exemplary embodiment of a signal conditioning unit 220 as shown in FIG. 2. This shows that the signal conditioning unit 220 shown in FIG. 4 has two channels, and comprises a first subunit 400 and a second subunit 410.

The first subunit 400 has a controllable high-pass filter 300, whose cut-off frequency can be predetermined by means of the control signal St1. Furthermore, the first subunit 400 has a signal propagation time matching device 310 and a controllable signal attenuation device 320. The way in which the controllable high-pass filter 300, the signal propagation time matching device 310 and the controllable signal attenuation device 320 operate has already been explained in conjunction with FIG. 3, so that reference should be made to the above statements for this purpose.

The second subunit 410 has a second signal propagation time matching device 420 and a second controllable signal attenuation device 430. The second signal propagation time matching device 420 is driven by a fourth control signal St4, and the second controllable signal attenuation device 430 is driven by a fifth control signal St5.

The five control signals St1 to St5 are fed into the signal conditioning unit 220 via one or more control connections 210 (see FIG. 2).

Since the signal conditioning unit 220 as shown in FIG. 4 has two channels and has two separate subunits 400 and 410, two or more types or mechanisms of crosstalk can be taken into account in the compensation signal Sc.

The optical crosstalk which occurs when a portion of the optical transmission signal from the laser diode 40 strikes the photodiode 80 (represented by the arrow Po in FIG. 1) normally has a flat and very broadband frequency response. In the exemplary embodiment shown in FIG. 4, the second subunit 410 is used to compensate for the optical crosstalk. This is because only the signal attenuation device 430 and the signal propagation time matching device 420 are required for correction purposes, owing to the flat and broadband frequency response of the optical crosstalk. There is no need for a high-pass or low-pass filter to correct the optical crosstalk.

In contrast to this, electrical crosstalk normally has a high-pass filter characteristic, so that a high-pass filter is also required to compensate for the electrical crosstalk, as is symbolized by the reference symbol Pe in FIG. 1.

In the exemplary embodiment shown in FIG. 4, the first subunit 400 (which, in comparison to the second subunit 410, also has the controllable high-pass filter 300) is provided in order to compensate for the electrical crosstalk. The first control signal St1 can be used to set the limit value or the cut-off frequency of the high-pass filter 300 so as to achieve a compensation signal Sc with a frequency response which corresponds to the electrical crosstalk.

Should any further physical phenomena for crosstalk occur, then further subunits can also be provided, if necessary, in addition to the two subunits 400 and 410.

Furthermore, of course, further controllable high-pass filters or controllable low-pass filters can be provided in each of the subunits, by means of which the frequency response of the compensation signal Sc which is produced by the signal conditioning unit 220 can be optimally matched to the respective crosstalk.

Figure 5:
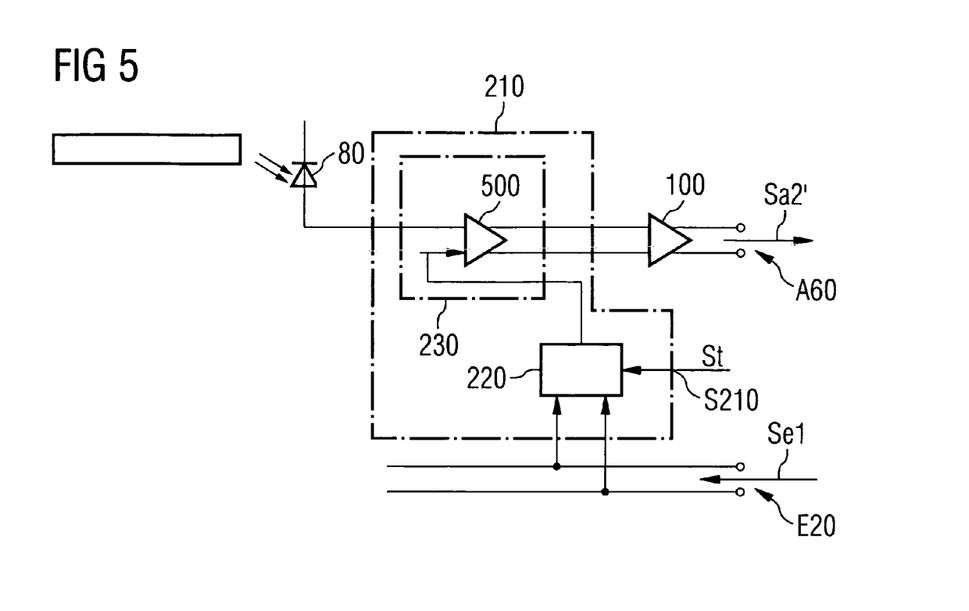
FIG. 5 shows a second exemplary embodiment of a transmitting and receiving device according to the invention.

FIG. 5 shows a second exemplary embodiment of a transmitting and receiving device according to the invention. In this exemplary embodiment, the subtraction device 230 is formed by a differentially operating transimpedance amplifier 500, which is connected directly to the photodiode 80 of the receiving device 60.

Thus, in the exemplary embodiment shown in FIG. 5, the preamplifier 90 that has been described in conjunction with FIGS. 1 and 2 is omitted, since this is integrated in the transimpedance amplifier 500 in the subtraction device 230. Otherwise, the exemplary embodiment illustrated in FIG. 5 corresponds to the exemplary embodiment illustrated in FIG. 2.

Figure 6:
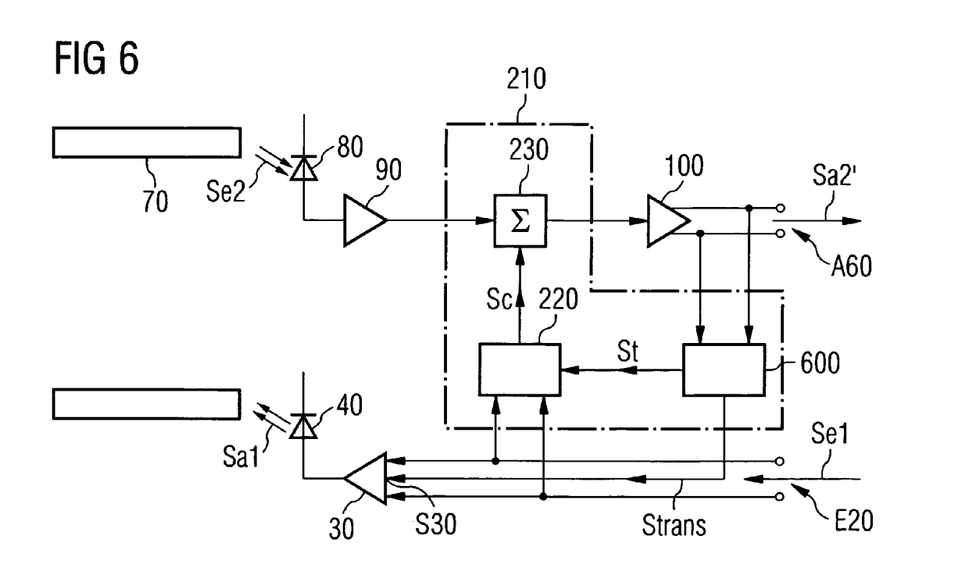
FIG. 6 shows a third exemplary embodiment of a transmitting and receiving device according to the invention having a compensation device which has a monitoring unit.

FIG. 6 shows a third exemplary embodiment of a transmitting and receiving device according to the invention. This exemplary embodiment has a monitoring unit 600 whose input side is connected to the electrical output A60 of the receiving device 60. On the output side, the monitoring unit 600 produces the control signals St1 to St3 or St1 to St5, which have been explained in conjunction with FIGS. 3 and 4, for driving the signal conditioning unit 220. The control signals St1 to St3 or St1 to St5 are symbolized in summarized form by the reference symbol St in FIG. 6.

Furthermore, the monitoring unit 600 is connected to a control connection S30 of the amplifier 30. This control connection S30 can be used to directly drive the amplifier 30 and hence the transmitting device 20 by means of a control signal Strans, so that the transmission signal from the transmitting device 20 can be modified, for example can have defined signals applied to it, or can even be switched off. The transmission signal from the transmitting device 20 is in this case modified or switched off in this way in order to make it possible to analyze and evaluate the extent of the electrical and optical crosstalk in detail so that, subsequently, the signal conditioning unit 220 can be optimally driven by means of the control signals St (or St1-St3 or St1-St5), and the crosstalk can be particularly effectively reduced.

Figure 7:
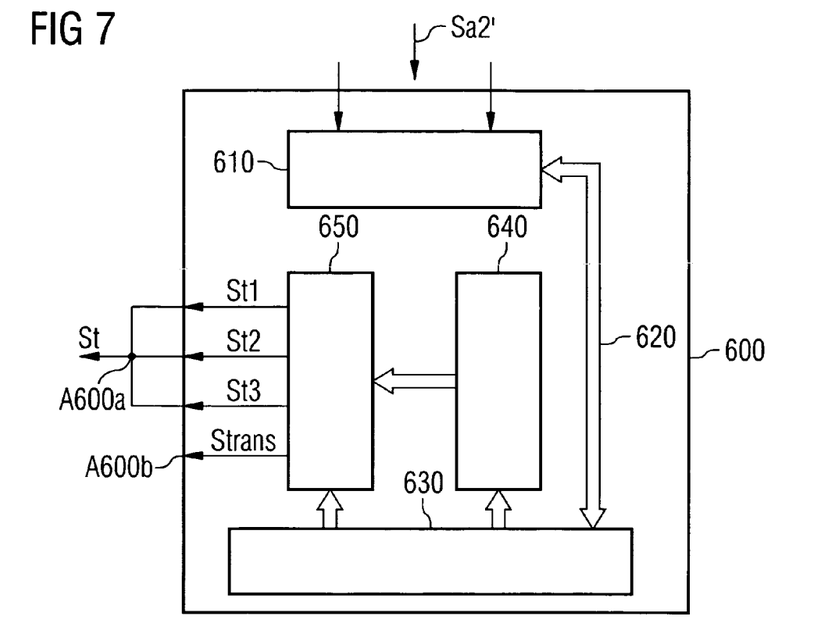
FIG. 7 shows an exemplary embodiment of the monitoring unit as shown in FIG. 6.

FIG. 7 shows an exemplary embodiment of the monitoring unit 600 illustrated in FIG. 6. This shows a measurement unit 610 which measures the output signal Sa2' from the receiving device 60 and transmits a corresponding measurement signal via the line 620 to a control unit (for example a state machine or a microcontroller) 630. The control unit 630 is connected to a register 640, in which control signals for driving the controllable signal conditioning unit 220 are stored, as shown in FIG. 6. The control unit 630 addresses the register 640 such that the respective control signals St1 to St3 which match the values measured by the measurement unit 610 are passed via a digital/analog converter unit 650, which is connected to the register 640, to the output A600a of the monitoring unit 600.

The control unit 630 furthermore produces one or more control signals Strans for driving the transmitting device 20, and emits these via the digital/analog converter unit 650 at an output A600b to the transmitting device 20.

Figure 8:
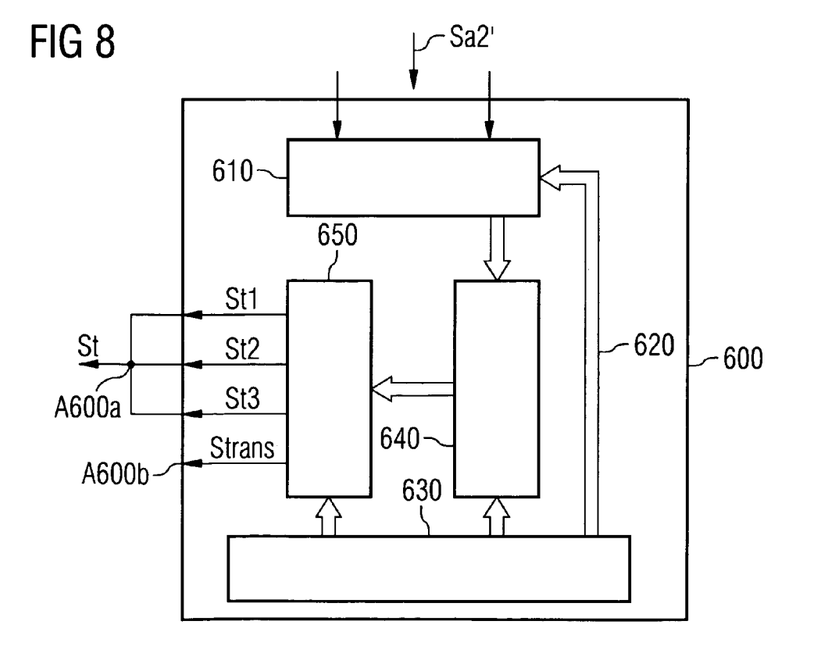
FIG. 8 shows a further exemplary embodiment of the monitoring unit shown in FIG. 6.

FIG. 8 shows an alternative refinement for a monitoring unit as shown in FIG. 6. In this monitoring unit, the measurement unit 610 is connected directly to the register 640. The measurement unit 610 is able to assess the amplitude and the frequency of the output signal Sa2' from the receiving device 60, and to cause the register 640 to emit one or more control signals, which match the respective output signal Sa2', to the signal conditioning unit 220 as shown in FIG. 6.

In this refinement of the monitoring unit 600, the measurement unit 610 is driven by the control unit 630 which, in particular, initiates and adjusts the compensation for the crosstalk when switching on (in the power-up phase) and permanently stores in the register 640 those control signals St1 to St3 which have been determined to be suitable. The measurement unit 610 then just calls up the control signals which are stored by the control unit 630 in the register 640.

If the signal conditioning unit 220 can be driven digitally, there is no need for the digital/analog converter unit 650, so that the register 640 and the control unit or the state machine 630 are then connected directly to the two outputs A600a and A600b of the monitoring unit 600.

In this refinement of the monitoring unit 600, the measurement unit 610 is driven by the control unit 630 which, in particular, initiates and adjusts the compensation for the crosstalk when switching on (in the power-up phase) and permanently stores in the register 640 those control signals St1 to St3 which have been determined to be suitable. The measurement unit 610 then just calls up the control signals which are stored by the control unit 630 in the register 640. If the signal conditioning unit 220 can be driven digitally, there is no need for the digital/analog converter unit 650, so that the register 640 and the control unit or the state machine 630 are then connected directly to the two outputs A600a and A600b of the monitoring unit 600.

LIST OF REFERENCE SYMBOLS

10 Transmitting and receiving device
20 Transmitting device
30 Amplifier
40 Laser diode
50 Optical waveguide
60 Receiving device
70 Second optical waveguide
80 Photodiode
90 Preamplifier
100 Main amplifier
200 Transmitting and receiving device
210 Compensation device
220 Signal conditioning unit
230 Subtraction device
300 Controllable high-pass filter
310 Signal propagation time matching device
320 Controllable signal attenuation device
400 First subunit
410 Second subunit
420 Second signal propagation time matching device
430 Second controllable signal attenuation device
440 Addition element
500 Transimpedance amplifier
600 Monitoring unit
610 Measurement unit
620 Monitoring line
630 Control unit
640 Register
650 Digital/analog converter unit

We claim:

1. A transmitting and receiving device comprising:
a transmitting device for producing a transmission signal;
a receiving device for producing a received signal; and
a compensation device which is connected to the transmitting device and to the receiving device and which at least reduces any crosstalk which is produced by the transmitting device in the receiving device, comprising:
a signal conditioning unit for forming a compensation signal which maps the crosstalk which is produced by the transmitting device in the receiving device;
a subtraction device which is connected to the receiving device and to the signal conditioning unit, and which subtracts the compensation signal from the received signal produced by the receiving device, thereby forming a modified received signal with reduced crosstalk;
at least one control connection via which the formation of the compensation signal can be controlled; and
a monitoring unit having an input side connected to receive at least one of the received signal with reduced crosstalk from the subtraction device or a signal which is proportional to the received signal, and having an output side for driving the signal conditioning unit such that the conditioning unit achieves maximum compensation for the crosstalk.

2. The transmitting and receiving device as claimed in claim 1, wherein the signal conditioning unit comprises at least two controllable subunits, each controllable subunit having an output side connected to a signal adder which uses output signals from the subunits to form the compensation signal.

3. The transmitting and receiving device as claimed in claim 2, wherein each subunit comprises at least one controllable signal attenuation device, one controllable high-pass filter and one controllable signal propagation time matching device.

4. The transmitting and receiving device as claimed in claim 3, wherein the transmitting device comprises an optical transmitting device for converting an input signal that is applied to an electrical input to an optical output signal, and for emitting the optical output signal.

5. The transmitting and receiving device as claimed in claim 4, wherein the input side of at least one subunit of the signal conditioning unit is connected to one of the electrical input and the optical output of the transmitting device.

6. The transmitting and receiving device as claimed in claim 4, wherein the transmitting device comprises an optical transmitting element and a monitor diode which is associated with the optical transmitting element, with at least one of the subunits being connected to a monitor connection of the monitor diode.

7. The transmitting and receiving device as claimed in claim 1, wherein the monitoring unit is connected to a control connection of the transmitting device, via which the transmitting device can be driven by the monitoring unit, with the monitoring unit being designed such that it modifies the transmission signal from the transmitting device, in particular by applying additional signals to it, or switches it off, in order to optimize the drive for the signal conditioning unit.

8. The transmitting and receiving device as claimed in claim 7, wherein the monitoring unit has a measurement unit for measurement of the received signal, whose crosstalk has been reduced, from the subtraction device, or of a signal which is proportional to it, the monitoring unit has a register in which control signals for driving the controllable signal conditioning unit are stored, and the monitoring unit has a control unit which selects the respectively suitable control signals as a function of the measurement values from the measurement unit.

9. The transmitting and receiving device as claimed in claim 8, wherein the output side of the register is connected to at least one digital/analog converter unit, which converts the control signals from the register from digital to analog form.

10. The transmitting and receiving device as claimed in claim 1, wherein the transmitting device is an optical transmitting device which converts an input signal, which is applied at an electrical input, to an optical output signal, and emits this optical output signal.

11. The transmitting and receiving device as claimed in claim 10, wherein the input side of the signal conditioning unit is connected to the transmission device.

12. The transmitting and receiving device as claimed in claim 11, wherein the signal conditioning unit is connected to the electrical input or to the optical output of the optical transmitting device.

13. The transmitting and receiving device as claimed in claim 11, wherein the optical transmitting device has an optical transmitting element and a monitor diode which is associated with the optical transmitting element, with the signal conditioning unit being connected to a monitor connection of the monitor diode.

14. The transmitting and receiving device as claimed in claim 11, wherein the signal conditioning unit has at least two controllable subunits, whose output sides are connected to a signal adder, which uses the output signals from the subunits to form the compensation signal.

15. The transmitting and receiving device as claimed in claim 14, wherein each of the subunits has at least one controllable signal propagation time matching device, one controllable signal attenuation device or one controllable high-pass filter.

16. The transmitting and receiving device as claimed in claim 15, wherein the signal conditioning unit has at least one control connection via which the formation of a compensation signal can be controlled, with a monitoring unit being connected to the at least one control connection, with the received signal, whose crosstalk has been reduced, from the subtraction device or a signal which is proportional to it being applied to the input side of the monitoring unit, and with the output side of the monitoring unit driving the signal conditioning unit so as to achieve maximum compensation for the crosstalk.

17. The transmitting and receiving device as claimed in claim 16, wherein the monitoring unit is connected to a control connection of the transmitting device, via which the transmitting device can be driven by the monitoring unit, with the monitoring unit being designed such that it modifies or switches off the transmission signal from the transmitting device in order to optimize the drive for the signal conditioning unit.

* * * * *